United States Patent [19]
Schwerdt

[11] Patent Number: 5,314,255
[45] Date of Patent: May 24, 1994

[54] BEARING HAVING RESILIENT BELLOWS AND BUMPERS

[75] Inventor: Hans-Werner Schwerdt, Laudenbach, Fed. Rep. of Germany

[73] Assignee: Firma Carl Freudenberg, Weinheim, Fed. Rep. of Germany

[21] Appl. No.: 984,145

[22] Filed: Dec. 2, 1992

[30] Foreign Application Priority Data

Dec. 4, 1991 [DE] Fed. Rep. of Germany ....... 4139923

[51] Int. Cl.$^5$ .............................................. F16C 27/06
[52] U.S. Cl. ..................................... 384/536; 384/215
[58] Field of Search ............... 384/536, 535, 582, 581, 384/215, 220, 222

[56] References Cited

U.S. PATENT DOCUMENTS

| | | | |
|---|---|---|---|
| 3,639,015 | 2/1972 | Maas | 384/536 |
| 3,961,829 | 6/1976 | Bowen et al. | 384/536 |
| 4,430,066 | 2/1984 | Benassi | 384/536 X |
| 4,722,618 | 2/1988 | Matsumoto et al. | 384/536 |
| 5,033,875 | 7/1991 | Moulinet | 384/536 |

*Primary Examiner*—Thomas R. Hannon
*Attorney, Agent, or Firm*—Kenyon & Kenyon

[57] ABSTRACT

A bearing includes two hollow cylindrical prop rings coaxially surrounding a central axis. A bellows element formed from a thermoplastic elastomer material elastically couples the prop rings in the radial direction. The bellows element has a radially extending profile that includes at least one fold protruding in the axial direction. The bellows element also has an axial length that does not overlap the axial length of said prop rings. At least one bumper is provided axially outside the axial length of the fold. The bumper has a profile that radially extends, during normal operational use, from at least one of the prop rings in the direction of the other prop ring. The bumper and the fold partially overlap.

15 Claims, 2 Drawing Sheets

BEARING HAVING RESILIENT BELLOWS AND BUMPERS

BACKGROUND OF THE INVENTION

The invention relates to a bearing that includes two hollow cylindrical prop rings that coaxially surround an imaginary axis and which are elastically coupled in the radial direction by a bellows element formed from an elastomer material. The bellows element has a profile that includes at least one fold that protrudes in the axial direction with an axial length that does not overlap the axial length of any of the prop rings. At least one bumper is provided axially beyond the axial length of the fold.

A bearing such as that described above is disclosed in the German Utility Model Patent 81 00 855. In this patent, an annular element of flexibly compliant material is permanently arranged directly between the surface area of an inner ring and the inner surface of an outer ring.

It should be noted that in this known bearing the ring-shaped element of flexible material is unevenly stressed, particularly when it is subjected to large loads, by compressive and shearing strains in the radial direction in the area of its folds that protrude in the axial direction. Moveover, the buffering effect of the bumper, which is shaped like a wedge and which is arranged in the flexibly compliant material of the ring-shaped element, is not very satisfactory. The wedge-shaped formation of the bumper causes the material to be stressed unevenly. Also, considerable deflecting movements in the radial direction cause the surfaces defining the recess to lie against one another. This considerably restricts the service lift, because cracks form in the circumferential direction due to shearing strains.

The present invention is directed to providing a bearing that has an increased service life while at the same time having an improved performance.

SUMMARY OF THE INVENTION

The present invention provides a bearing that includes two hollow cylindrical prop rings coaxially surrounding a central axis. A bellows element formed from a thermoplastic elastomer material elastically couples the prop rings in the radial direction. The bellows element has a radially extending profile that includes at least one fold protruding in the axial direction. The bellows element also has an axial length that does not overlap the axial length of said prop rings. At least one bumper is provided axially outside the axial length of the fold. The bumper has a profile that radially extends, during normal operational use, from at least one of the prop rings in the direction of the other prop ring. The bumper and the fold partially overlap.

Constructing the bellows element of thermoplastic, elastomer material is particularly advantageous from an economic perspective because the components can be easily manufactured. The formation of the bumpers, which extend essentially in the radial direction of the bearing, effectively prevents the important, functioning components from being damaged should extreme radial deflections occur. The maximum deflection of the bearing in the radial direction can be precisely adjusted by varying the length of the bumpers.

According to another aspect of the invention, the bellows element has two folds that protrude opposite to one another in the axial direction and which are arranged on axial planes that are displaced from one another relative to the imaginary axis, and which are designed to be integrally connected in the radial direction. With this provision, the bearing achieves a considerable radial mobility. Further, the bellows element and the folds configured inside the bellows element are subjected to extremely low stresses during radial deflecting movements. A bearing designed in this manner has consistently good working properties over a long service life.

To fabricate the bellows element in a simple manner, several bumpers are provided in the area of at least one axial boundary edge of the bellows element. The bumpers are separated from one another in the circumferential direction by clearance spaces. The bumpers can be formed as radial and/or axial limit stops.

According to another aspect of the invention, ring-shaped bumpers are provided. As a result of this provision, when extreme deflections of the two prop rings relative to one another are restricted, there is a relatively smaller compressive load per unit area of the buffers. This reduces the specific material load and increases service life.

At the diagonally opposing corners of its profile, the bellows element may be provided with bumpers that protrude in opposite directions. As a result of this bumper configuration, a uniform loading of the sealing bellows is guaranteed in the radial direction. Moreover, no flexural torques are exerted on the part surrounded by the bearing.

The bumpers may be made of elastomer material and may form an integral unit with the bellows element. This embodiment of the invention is advantageous from the standpoint of production engineering. Moreover, bumpers formed from an elastomer material make ti possible to reliably avoid limit-stop noises in cases of extreme bearing deflections.

According to yet another aspect of the invention, the bumpers can be formed by limit-stop sheet metal plates, which are disposed in the area of at least one of the prop rings. By having separately formed bumpers that consist of sheet metal, different bumper models can be manufactured with relative ease to be subsequently allocated to the bearing. In particular, a bumper manufactured as a radial and axial limit stop is advantageous, because both the bumper itself as well as the bellows element can be manufactured simply and separately from the standpoint of production engineering.

According to another aspect of the invention, the bellows element may be reinforced in the area of at least one prop ring by a metal insert. The metal insert, which may have perforations to be penetrated by the bellows element, provides greater stability for the relatively soft bellows element on the outer circumference. By providing a metal insert, it is also possible to install the bearing directly in a circular opening of a housing without damaging the thermoplastic elastomer material. The perforations in the metal insert which are penetrated by the bellows element allow the bellows element to be properly and simply affixed to the metal insert.

The components of the bellows element that penetrate through the perforations can be disposed in the area of the rear side of the perforations to form an integral unit. In this case it is advantageous if the mounting element of the bearing, which may, for example, be in the form of a base, is also manufactured from the inexpensive, thermoplastic elastomer material and is directly premolded in one piece on the bellows element.

The method of the present invention for manufacturing a bearing includes using a thermoplastic elastomer material to form the bearing. Subsequent to molding and hardening the bearing, a portion of at least one of the prop rings, in the area of its end that protrudes in the axial direction, is thermally softened once again to be reshaped in the direction of the other prop ring and is then hardened through cooling. This method allows the bearing to be produced in a simple manner. To mold the bearing, the limit stops are initially premolded in one piece in the axial direction onto the prop rings of the bellows element. After being removed from the mold, the limit stops are heated once more and shaped in the desired direction.

DETAILED DESCRIPTION

Figure 1:
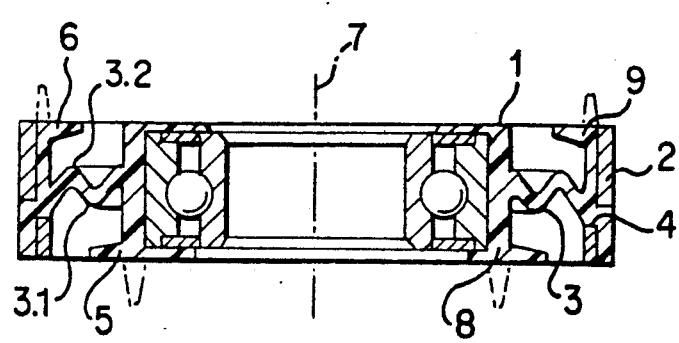
FIG. 1 shows a cross-sectional view of the bearing constructed according to the principles of the present invention.

FIG. 1 shows a bearing that includes two hollow cylindrical prop rings 1 and 2 that coaxially surround an imaginary axis 7. The prop rings 1 and 2 are elastically coupled in the radial direction by means of a bellows element 3 formed from a thermoplastic elastomer material. The bellows element 3 has two folds 3.1 and 3.2 that protrude oppositely to one another in the axial direction and bumpers 5 and 6 that are provided to restrict a radial deflection of the bearing. The bumpers 5 and 6, which assume the positions depicted in FIG. 1 by the dotted lines after the bearing is removed from the mold, extend, after being heated once more and subsequently shaped, essentially perpendicular to the imaginary axis 7. Several bumpers are advantageously provided, which are separated from one another in the circumferential direction by clearances. As a result, accumulation of disadvantageous material and a high bearing weight are avoided. The limit stops 5 and 6 protect the folds 3.1 and 3.2 of the bellows element 3 from damage and excessive mechanical stress from large bearing deflections in the radial direction. The second supporting element 2 includes a crimped metal ring which has perforations 4 that are penetrated by the bellows element 3. This configuration allows for good, resistant, and long-lasting positioning of the bellows element 3 on the prop ring 2, as well as a bearing arrangement in a housing surrounding the bearing on the outside.

Figure 2:
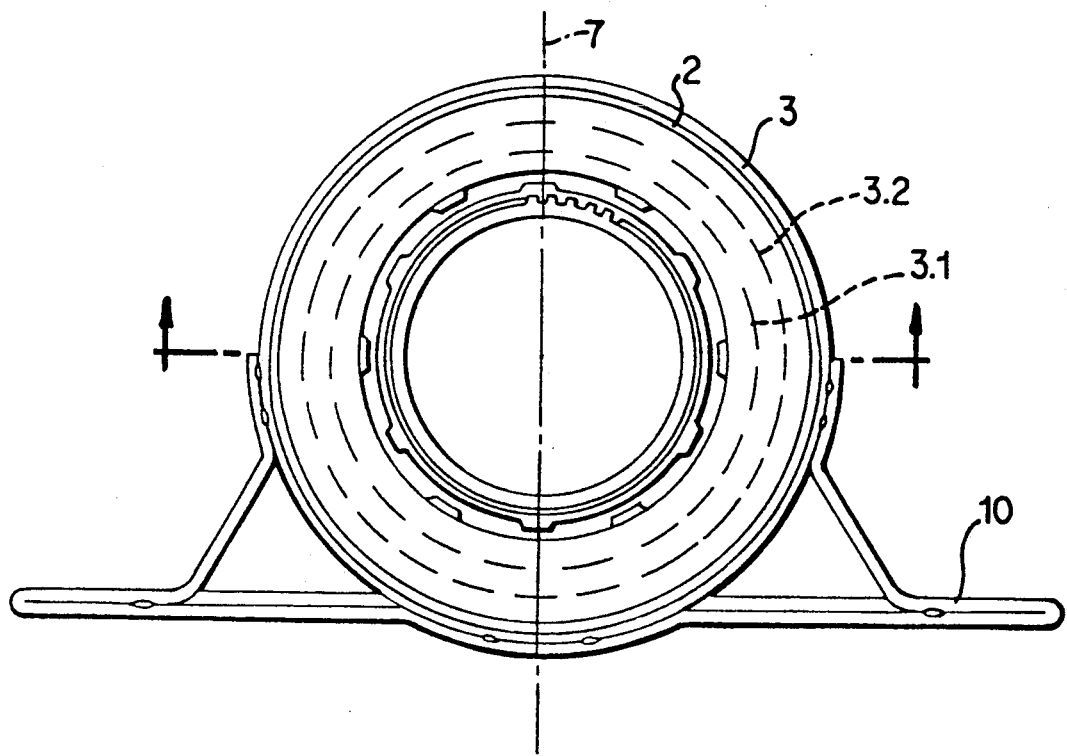
FIG. 2 shows a top view of the bearing shown in FIG. 1.

FIG. 2 shows an alternative view of the bearing depicted in FIG. 1. In this embodiment, the mounting base 10 provided to secure the bearing is formed from metal and is attached to the metal insert of the prop ring 2. A similarly designed mounting arrangement is also possible and particularly advantageous for less heavily stressed bearings, when the mounting base 10 is premolded directly on the thermoelastic material of the bellows element 3 in the area of the prop ring 2. To more simply depict the invention, the limit stop 5 is shown in its state immediately after being removed from the mold and before being reshaped in the radial direction.

The bearings shown in FIGS. 1 and 2 can be used, for example, as a bearing arrangement for a Cardan shaft.

Figure 3:
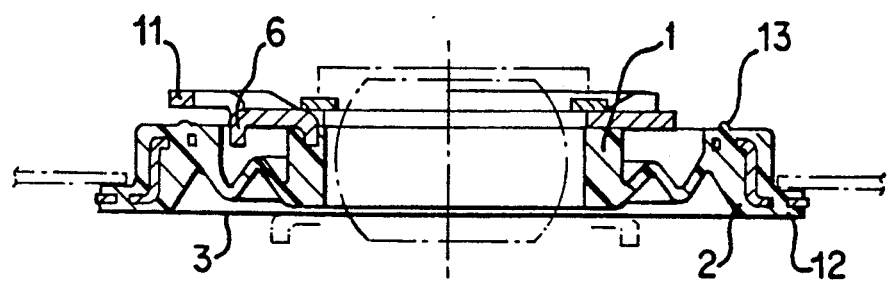
FIG. 3 shows an alternative embodiment of the bearing of the present invention taken along line A—A in FIG. 4.

FIG. 3 shows another embodiment of the bearing of the present invention, in which the bumper 6 is designed as a radial limit stop formed from sheet metal. An axial limit stop 11 is premolded on the radial stop to restrict deflecting movements of the prop rings 1 and 2 in the axial direction. In this embodiment, an additional limit stop 12 is provided in the area of the outer prop ring 2. The limit stop 12 projects in the radially outward direction and abuts a component only schematically illustrated. Configured in the area of the radially external prop ring 2, is a circular, flexible bulb 13 formed from an elastomer material and which is integrally formed with the bellows element 3. When the two prop rings 1 and 2 deflect relative to one another, the bulb 13 can be made to engage with the axial limit stop 11. The path limitation can thereby show a progressive force-path characteristic curve.

Figure 4:
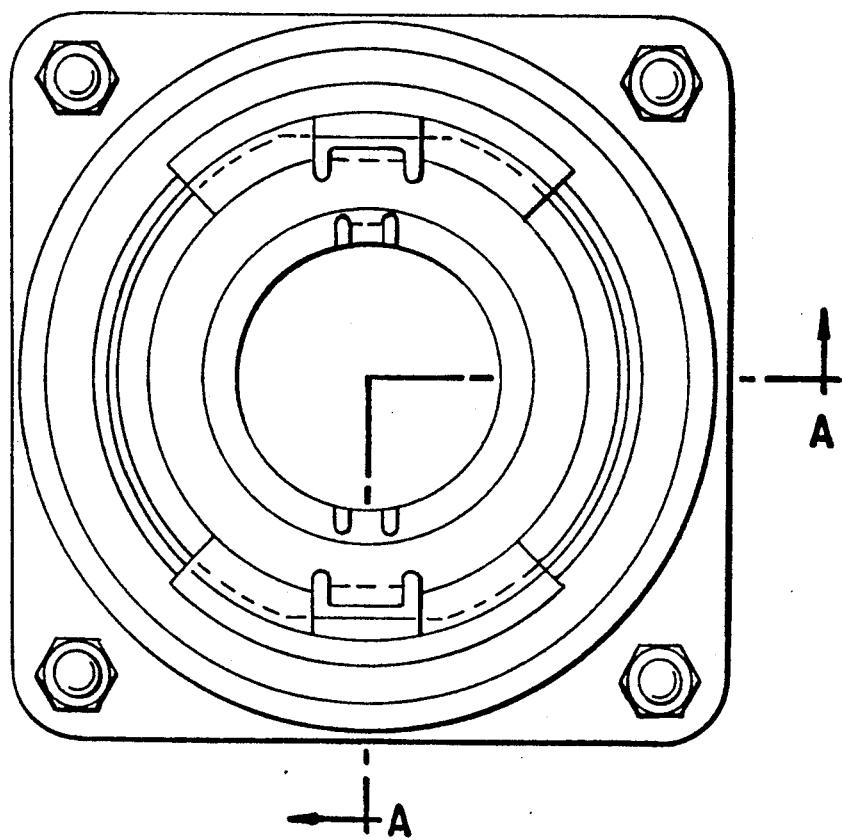
FIG. 4 show a top view of the bearing shown in FIG. 3.

FIG. 4 shows a plan view of the bearing depicted in FIG. 3.

What is claimed is:

1. A bearing comprising:
   two hollow cylindrical prop rings coaxially surrounding a central axis;
   a bellows element formed from a thermoplastic elastomer material elastically coupling said prop rings in the radial direction, the bellows element having a radially extending profile that includes at least one fold protruding in the axial direction and having an axial length that does not overlap the axial length of said prop rings;
   at least one bumper provided axially outside the axial length of the fold, said at least one bumper having a profile that radially extends, during normal operational use, from at least one of said prop rings in the direction of the other prop ring, said bumper and said fold partially overlapping.

2. The bearing of claim 1 wherein said bellows element has two folds protruding in the axial direction opposite to one another and which are arranged on axial planes that are displaced from one another relative to said central axis, said folds being integrally coupled in the radial direction.

3. The bearing of claim 2 further comprising a ring-shaped bumper disposed in the area of at least one axial boundary edge of the bellows element, said bumper forming a radial and/or axial limit stop.

4. The bearing of claim 2 further comprising a plurality of bumpers disposed in the area of at least one axial boundary edge of the bellows element, each of said bumpers being separated from one another by circumferentially directed clearance spaces, said bumpers forming radial and/or axial limit stops.

5. The bearing of claim 4 wherein said bumpers are formed from an elastomer material and form an integral unit with the bellows element.

6. The bearing of claim 4 wherein said bumpers are formed as a radial limit stop formed from sheet metal, said bumpers being disposed in the are of at least one of said prop rings.

7. The bearing of claim 6 further comprising a metal insert reinforcing the bellows element in the area of at least one of said prop rings.

8. The bearings of claim 7 wherein said metal insert has perforations that are penetrated by said bellows element.

9. The bearing of claim 8 wherein said bellows elements has components that penetrate through said perforations, said components being disposed in a rear side area of the perforations to form an integral unit.

10. The bearing of claim 1 further comprising a ring-shaped bumper disposed in the area of at least one axial boundary edge of the bellows element, said bumper forming a radial and/or axial limit stop.

11. The bearing of claim 10 further comprising two bumpers disposed at diagonally opposing corners of said profile of the bellows element, said bumpers protruding in opposite directions relative to one another.

12. The bearing of claim 11 further comprising a metal insert reinforcing the bellows element in the area of at least one of said prop rings.

13. The bearing of claim 1 further comprising two bumpers disposed at diagonally opposing corners of said profile of the bellows element, said bumpers protruding in opposite directions reactive to one another.

14. The bearing of claim 13 wherein said bumpers are formed from an elastomer material and form an integral unit with the bellows element.

15. The bearing of claim 1 further comprising a metal insert reinforcing the bellows element in the area of at least one of said prop rings.

* * * * *